VALIDITY CHECK CONTROL OF PLURAL INPUTS TO RELAY CIRCUITS

Filed Nov. 23, 1959

INVENTORS.
LESLIE B. HAIGH
HENRY F. HERBIG
BY MARCO PADALINO
Charles Baraff
AGENT 3,208,042

VALIDITY CHECK CONTROL OF PLURAL INPUTS TO RELAY CIRCUITS

Leslie B. Haigh, West Orange, Henry F. Herbig, Smoke Rise, and Marco Padalino, Nutley, N.J., assignors to International Telephone and Telegraph Corporation, Nutley, N.J., a corporation of Maryland Filed Nov. 23, 1959, Ser. No. 854,894
8 Claims. (Cl. 340—149)

This invention generally relates to amplitude discriminators, and to check circuits utilizing same and more particularly relates to validity check circuits for indicating the number of conductors energized on groups of conductors.

In one aspect, this application is an improvement over the check circuit system disclosed in the U.S. patent application of H. F. Herbig-L. Medler, Serial No. 684,140, filed September 16, 1957, now U.S. Patent 3,073,905, granted January 15, 1963.

In recording telephone systems and other electrical recording systems, information is often indicated by the energization of various combinations of conductors in one or more groups of conductors. For example, in the recording system disclosed in the aforementioned patent application, information to be recorded is indicated by the grounding of a combination of two conductors out of a group of five conductors. A validity check circuit establishes in this instance that the grounding of fewer or more than two conductors in a group is an error.

Prior art validity check circuits have been characterized by the use of many relays and associated electrical components, such as resistors, capacitors and the like.

An object of the present invention is to simplify validity check circuits by reducing the complexity thereof. In accordance with this object an improved arrangement is provided by using a single amplitude discriminator in place of the number of relays formerly used.

Another object is the provision of an improved amplitude discriminator.

A feature of the invention is a validity check circuit comprising a single relay shunted by a switching device (such as, for example, a transistor, a switching diode, an electron tube, especially of the gas type, etc.) and responsive only to incoming signals within a predetermined amplitude range to provide the validity check.

In a typical embodiment of the invention, it is applied to a system disclosed in the aforementioned application wherein two conductors in a group of five conductors are normally energized. Its use however, is more general and applicable to a validity check for "$k$" conductors out of a group or groups of "$n$" conductors, where $k<n$.

The features of the invention and its mode of operation will be more fully understood from the accompanying description of embodiments of the invention, reference being had to the drawings, wherein.

Figures 1, 2, 3:
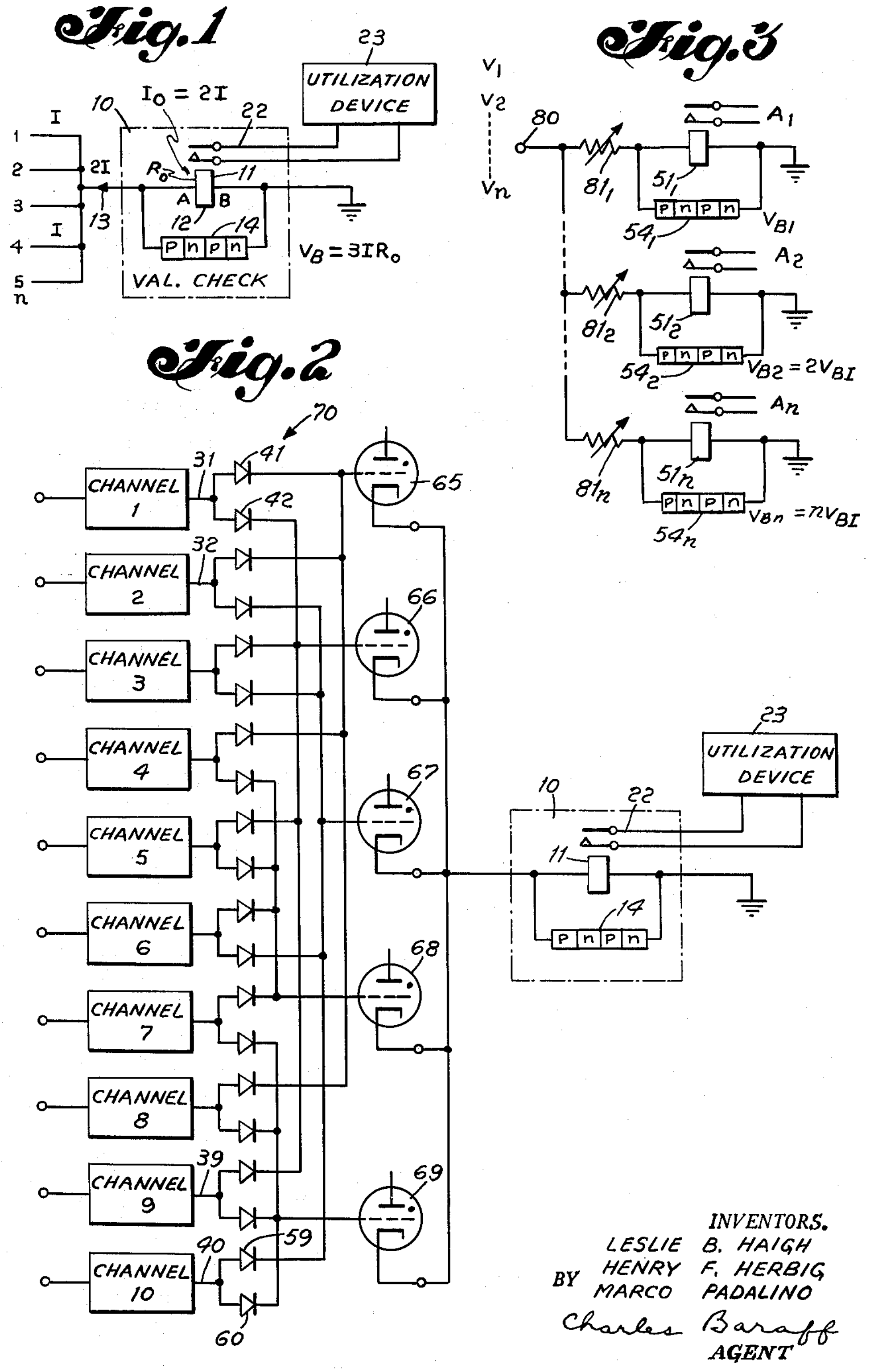
FIG. 1 is a schematic diagram of a single relay validity check circuit.
FIG. 2 is a schematic diagram of the single relay validity circuit of FIG. 1 associated with a ten channel circuit of a PABX system.
FIG. 3 is a schematic diagram of an amplitude discriminator with single relay circuits shunted by switching diodes for single amplitude level discrimination.

In the party line detector disclosed in the aforementioned Herbig–Medler application, there is disclosed an output of ten channels, each having a band pass filter which will pass only a narrow range of frequencies. The outputs of these filters are coupled by a diode matrix to five gas tubes, such that only two-out-of-five will fire for an output of any one of the ten channels. Associated with each gas tube is a separate relay operated by the firing of the corresponding gas tube, whereby a pair of operated relays forms an essential part of the two-out-of-five check circuits. Accordingly, when two out of the five gas tubes are fired, a return ground is applied to an indicator circuit including a check relay, for indicating proper operation.

In accordance with the present invention, the many relays of a two-out-of-five check circuit are replaced by a single relay shunted by a switching device, as aforementioned, having a predetermined breakdown voltage.

FIG. 1 shows the general arrangement according to the present invention in which a number of lines $l$ to $n$ are connected to a single validity check circuit 10. FIG. 1 also shows a specific arrangement where $n=5$ and $k=2$, with "$n$" signifying the total number of conductors in parallel and "$k$" signifying the number of conductors which should have the predetermined input signal or voltage level for normal operation.

The validity check circuit 10 consists of a relay 11 having its coil 12 connected at one end to a common point 13 of conductor 1–5 and its other end grounded for the specific case shown. The coil 12 is shunted by a switching device 14 in the form of a so-called "switching diode" which is preferably a silicon pnpn diode. Such diodes are described for example in U.S. application of A. R. Gobat, Serial No. 558,133 filed January 9, 1956, now U.S. Patent 2,981,849 granted April 25, 1961, or in U.S. Patent No. 2,855,524 of W. Shockley for "Semiconductive Switch," granted October 7, 1958.

Assuming that $I$ represents the unit of current on each of the two energized conductors 1 and 4, then the relay 11 must be characterized by a relay-operating current $I_0$ greater than $(k-l)I$ and smaller than or equal to $kI$ i.e. in this situation where $k=2$: $I<I_0\leqq 2I$. Under these circumstances, when two out of five conductors are energized, the relay 11 operates.

The breakdown voltage $V_B$ of the silicon pnpn diode 14 is such as to approximately cause a short circuit of the relay 11 when the input to the relay is $(k+l)I$ i.e. in this situation $V_B=3IR_0$, where $R_0$ is the relay resistance.

If, therefore, three or more input conductors are energized, providing three or more units of current to relay 11, the voltage between points A, B would be $V_B\leqq 3IR_0$, such that switching diode 14 is triggered to the conductive state, thereby shunting the relay and preventing its operation. Upon operation of the relay in the case when $k=2$ and $n=5$, an indicator or utilization circuit 23 is activated by the closing of relay contacts 22. The utilization circuit 23 represents any other equipment or device, which needs to know if a current validity check has been made.

FIG. 2 shows in a preferred embodiment an application of the validity check circuit 10 to a party line detector for ten subscribers. A system for 10 subscribers is disclosed in the aforementioned application of Herbig and Medler.

The outputs 31–40 of ten different frequency channels corresponding to ten (10) subscribers with identifying frequencies $f_1, \ldots f_{10}$ are connected by a matrix of coupling diodes 41, 42, etc. to the triggering grids of five gas tubes 65–69, respectively. The input circuit to the gas tubes 65–69 leading through the diode matrix 70 is such that two out of five tubes will fire for an output of any one of the ten channels. Each of the cathodes of the gas tubes 65–69 is connected to a single validity check circuit 10, corresponding to the circuit arrangement shown in FIG. 1.

When only two out of the five gas tubes are triggered and fired, the relay 11 operates, and its contact or contacts 22 supply an external circuit or apparatus with an indication that a correct validity check has been performed.

FIG. 3 shows a diode shunted relay circuit utilized in voltage or current amplitude discriminator arrangements.

Such amplitude discriminators are level filters wherein signals applied to input 80 having predetermined levels $V_1 \ldots V_n$ of voltage, for example, can be segregated into $n$ corresponding paths $A_1 \ldots A_n$ by a set of relays $\mathbf{51_1}$, $\mathbf{51_2} \ldots \mathbf{51_n}$ associated with $n$ parallel conductors. The relays are each shunted by a switching pnpn diode $\mathbf{54_1}$, $\mathbf{54_2} \ldots \mathbf{54_n}$ such as shown in FIG. 3. Each relay will operate only for one predetermined signal level at the input 80. Variable resistors $\mathbf{81_1}$, $\mathbf{81_2} \ldots \mathbf{81_n}$ are provided to properly set each respective relay circuit $\mathbf{51_1}$, $\mathbf{52_2} \ldots \mathbf{51_n}$.

Thus, when a voltage having a value $V_n$ is applied to the input 80, all the switching diodes will become conductive and shunt their corresponding relay with the exception of diode $\mathbf{54_n}$. Relays $\mathbf{51_1} \ldots \mathbf{51_{n-1}}$ will remain unoperated. However, at the same time, the current through relay $\mathbf{51_n}$ will be sufficient to operate it.

The N signal levels $V_1 \ldots V_n$ are integrally related as follows:

$$V_1$$
$$V_2=2V_1$$
$$V_n=nV_1$$

The breakdown $V_{B1}$–$V_{Bn}$ voltages for the switching diodes $\mathbf{54_1} \ldots \mathbf{54_n}$ are also integrally related as follows:

$$V_{B1}$$
$$V_{B2}=2V_{B1}$$
$$V_{Bn}=nV_{B1}$$

It is to be understood that the above-described arrangements are illustrative of the application of the principles of the invention. Numerous other arrangements may be devised by those skilled in the art from the above description.

While we have described above the principles of our invention in connection with specific apparatus, it is to be clearly understood that this description is made only by way of example and not as a limitation to the scope of our invention as set forth in the objects thereof and in the accompanying claims.

We claim:

1. A validity check circuit comprising a plurality of "$n$" energizable conductors, wherein "$n$" is an integer, a single two-state device connected to all of said conductors, said two-state device having an operative threshold at a level corresponding to the energization of "$k$" conductors, where "$k$" is an integer less than "$n$" and at least equal to 1, and a switching device coupled in shunt relation to said two-state device, said switching device having a breakdown level corresponding to the energization of $k+1$ conductors to prevent said two-state device from operating when more than $k$ conductors are energized.

2. The validity check circuit of claim 1, wherein said two-state device is a single relay.

3. The validity check circuit of claim 1, wherein said switching device is a semiconductor electron device.

4. The validity check circuit of claim 1, wherein said switching device is a silicon pnpn diode.

5. The validity check circuit of claim 2, wherein $n$ equals 5 and $k$ equals 2, said single relay having an operating voltage equal to 2IR and the breakdown level of said switching device equals 3IR, where I and R are the current in the relay and its resistance, respectively.

6. An amplitude level discriminator system comprising a source of signals, a plurality of conductive paths coupled to said source, a two-state device connected in each path, each of the two-state devices having a different amplitude threshold level at which they operate, and a plurality of bistable switches, each shunting one of said two-state devices and each having a different breakdown level greater than the operative level of the two-state device which it shunts but less than that of the two-state device having the next higher threshold level.

7. The amplitude level discriminator of claim 6, wherein the bistable switches are silicon diodes, and the breakdown voltages thereof are successively integrally related.

8. The amplitude level discriminator of claim 6, wherein the bistable switches are solid-state diodes, and an adjustable resistor is included in each path for controlling the current in its associated two-state device.

References Cited by the Examiner

UNITED STATES PATENTS

| | | | |
|---|---|---|---|
| 1,744,840 | 1/30 | Strieby et al. | 340—172 |
| 2,149,355 | 3/39 | Lundstrom | 340—172 |
| 2,244,257 | 6/41 | Maul | 340—347.1 |
| 2,484,226 | 10/49 | Holden | 178—23.1 |
| 2,541,039 | 2/51 | Cole | 328—116 |
| 2,566,426 | 9/51 | Parks | 340—172 |
| 2,653,996 | 9/53 | Wright | 178—23.1 |
| 2,674,727 | 4/54 | Spielberg | 178—23.1 |
| 2,682,573 | 6/54 | Hunt | 178—23.1 |
| 2,703,382 | 3/55 | Cleary | 328—171 |
| 2,783,453 | 2/57 | Rose | 340—149 |
| 2,843,839 | 7/58 | Cunningham et al. | 340—149 X |
| 2,862,201 | 11/58 | Lewinstein et al. | 340—347.1 |
| 2,943,303 | 6/60 | Barber | 340—149 X |
| 2,955,237 | 10/60 | Wyndham | 317—33 |
| 2,971,102 | 2/61 | Schultz | 307—93 |
| 2,997,646 | 8/61 | Voegtlen | 340—149 X |
| 3,009,110 | 11/61 | Cole | 328—115 |
| 3,048,718 | 8/62 | Starzer et al. | 307—93 |
| 3,131,309 | 4/64 | Blocher | 307—88.5 |

OTHER REFERENCES

The Design of Switching Circuits, by Keister et al., Van Nostrand Co., 1951, pp. 429–430.

NEIL C. READ, *Primary Examiner.*

L. MILLER ANDRUS, STEPHEN W. CAPELLI, *Examiners.*